US009958688B2

(12) United States Patent
Lin et al.

(10) Patent No.: US 9,958,688 B2
(45) Date of Patent: May 1, 2018

(54) STEREOSCOPIC DISPLAY

(71) Applicants: BOE TECHNOLOGY GROUP CO., LTD., Beijing (CN); BEIJING BOE DISPLAY TECHNOLOGY CO., LTD., Beijing (CN)

(72) Inventors: Lifeng Lin, Beijing (CN); Hongming Zhan, Beijing (CN); Yongcan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 508 days.

(21) Appl. No.: 14/421,211

(22) PCT Filed: May 22, 2014

(86) PCT No.: PCT/CN2014/078121
§ 371 (c)(1),
(2) Date: Feb. 12, 2015

(87) PCT Pub. No.: WO2015/100924
PCT Pub. Date: Jul. 9, 2015

(65) Prior Publication Data
US 2015/0346500 A1 Dec. 3, 2015

(30) Foreign Application Priority Data
Dec. 30, 2013 (CN) .......................... 2013 1 0746259

(51) Int. Cl.
*G02F 1/1335* (2006.01)
*G02B 27/22* (2018.01)

(52) U.S. Cl.
CPC ....... *G02B 27/2214* (2013.01); *G02F 1/1335* (2013.01); *G02F 1/133512* (2013.01); *G02F 1/133553* (2013.01); *G02F 1/133605* (2013.01)

(58) Field of Classification Search
USPC .......................................... 349/15
See application file for complete search history.

(56) References Cited

U.S. PATENT DOCUMENTS

| 6,377,295 B1 | 4/2002 | Woodgate et al. | |
| 2004/0150583 A1* | 8/2004 | Fukushima | G02B 27/2214 345/6 |

(Continued)

FOREIGN PATENT DOCUMENTS

| CN | 1614476 A | 5/2005 |
| CN | 1727947 A | 2/2006 |

(Continued)

OTHER PUBLICATIONS

Office Action dated Nov. 2, 2016 issued in corresponding Chinese Application No. 201310746259.6.

(Continued)

*Primary Examiner* — Edward Glick
*Assistant Examiner* — David Chung
(74) *Attorney, Agent, or Firm* — Nath, Goldberg & Meyer; Joshua B. Goldberg

(57) ABSTRACT

The present invention provides a stereoscopic display, which comprises a backlight, a display panel, a phase delay film arranged at a light-exiting side of the display panel, and a visual angle adjusting baffle arranged between the backlight and the display panel and parallel to the display panel for adjusting a vertical or horizontal stereoscopic visual angle of the stereoscopic display. The shading strips of the visual angle adjusting baffle can be reflective strips which can (Continued)

reflect light from the backlight arriving at the reflective strips back to the backlight, and the light reflected by the reflective strips to the backlight can enter the display panel after passing through the transparent strips in the visual angle adjusting baffle, thus improving display brightness of the stereoscopic display.

7 Claims, 8 Drawing Sheets

(56) References Cited

U.S. PATENT DOCUMENTS

| | | | | |
|---|---|---|---|---|
| 2004/0240777 | A1* | 12/2004 | Woodgate | G02B 27/2214 385/16 |
| 2006/0050197 | A1* | 3/2006 | Hu | G02B 6/005 349/61 |
| 2009/0225244 | A1* | 9/2009 | Wang | G02B 27/2214 349/15 |
| 2010/0313163 | A1* | 12/2010 | Yamada | G03G 15/502 715/781 |
| 2012/0147301 | A1* | 6/2012 | Jeon | G02B 27/2242 349/96 |
| 2013/0033750 | A1* | 2/2013 | Kim | G02B 27/26 359/465 |

FOREIGN PATENT DOCUMENTS

| | | |
|---|---|---|
| CN | 1971356 A | 5/2007 |
| CN | 2911717 Y | 6/2007 |
| CN | 101668220 A | 3/2010 |
| CN | 101907774 A | 12/2010 |
| CN | 102590922 A | 7/2012 |
| CN | 202748540 U | 2/2013 |
| CN | 102998890 A | 3/2013 |
| CN | 103149732 A | 6/2013 |
| CN | 103698933 A | 4/2014 |
| EP | 2653906 A2 | 10/2013 |

OTHER PUBLICATIONS

Office Action dated Dec. 3, 2015 issued in corresponding Chinese Application No. 201310746259.6.
English translation of the Written Opinion of the International Searching Authority filed with the IDS dated Feb. 12, 2016.
International Search Report for International Application No. PCT/CN2014/078121.

* cited by examiner

STEREOSCOPIC DISPLAY

This is a National Phase Application filed under 35 U.S.C. 371 as a national stage of PCT/CN2014/078121, filed May 22, 2014, an application claiming the benefit of Chinese Application No. 201310746259.6, filed Dec. 30, 2013, the content of which is hereby incorporated by reference in its entirety.

FIELD OF THE INVENTION

The present invention relates to the field of liquid crystal display technology, and particularly to a stereoscopic display.

BACKGROUND OF THE INVENTION

Polarization 3D technology is also known as polarized 3D technology, in which an original image is decomposed in accordance with the principle that light has a "vibration direction", specifically, the original image is decomposed into two groups of images, i.e., an image of polarized light in the vertical direction and an image of polarized light in the horizontal direction, or an image of left-handed circularly polarized light and an image of right-handed circularly polarized light, and then left and right lenses of a pair of 3D spectacles respectively allow the polarized light in the vertical direction and the polarized light in the horizontal direction to pass, or respectively allow the left-handed circularly polarized light and the right-handed circularly polarized light to pass, in this way, the left and right human eyes may respectively receive a group of images in two groups of different images, and a stereoscopic image is synthesized in the brain finally.

FIG. 1 is a schematic diagram of a structure of a stereoscopic display in the prior art, as shown in FIG. 1, the stereoscopic display comprises a backlight 1, a display panel 2 and a phase delay film 4, wherein the display panel 2 comprises an array substrate 21 and a color filter substrate 22, which are arranged oppositely, and a liquid crystal layer 23 arranged between the array substrate 21 and the color filter substrate 22. The color filter substrate 22 comprises a substrate 221, and a black matrix 222 and a plurality of pixel display areas 223, which are formed at the light-entering side of the substrate 221. A lower polarizer 24 is formed at the light-entering side of the array substrate 21, and an upper polarizer 25 is formed at the light-exiting side of the substrate 221 in the color filter substrate 22. The backlight 1 is used for providing light to the display panel 2.

FIG. 2 is a schematic diagram of a light path during display of the stereoscopic display in FIG. 1, as shown in FIG. 2, L refers to a pixel width (including a line width of the black matrix in the vertical direction and a width of a pixel display area in the vertical direction) of the display panel 2 in the vertical direction, $h_1$ refers to the line width of the black matrix 222 in the vertical direction, X refers to the distance between the light-entering surface of the black matrix 222 and the light-entering surface of the phase delay film 4, $\theta_1$ refers to the included angle between first emitting light 51 and second emitting light 52 of any one pixel display area 223 of the display panel 2, $\theta_1 = \alpha_1 + \beta_1$, wherein $\alpha_1$ refers to the included angle between the first emitting light 51 and a surface normal of the display panel 2, and $\beta_1$ refers to the included angle between the second emitting light 52 and a surface normal of the display panel 2. When the line width of the black matrix 222 in the vertical direction is $h_1$, the width of the stripe of the phase delay film 4 in the vertical direction is the same as the pixel width L, and the center line of the stripe of the phase delay film 4 in the vertical direction is overlapped with the center line of the pixel display area 223 of the display panel 2 in the vertical direction, $\tan \alpha_1 = \tan \beta_1 = (h_1/2)/X$, and it can be seen from the formula that, $\theta_1$ can be increased by increasing $h_1$. Since the vertical stereoscopic visual angle of the stereoscopic display is in direct proportion to $\theta_1$, when $\theta_1$ is increased, the vertical stereoscopic visual angle can be enlarged. In order to increase the vertical stereoscopic visual angle of the stereoscopic display, in the prior art, the line width of the black matrix in the vertical direction is increased. FIG. 3 is a schematic diagram of a structure of a stereoscopic display with increased line width of a black matrix in the vertical direction in the prior art, FIG. 4 is a schematic diagram of a light path during display of the stereoscopic display in FIG. 3, as shown in FIG. 3 and FIG. 4, the line width of the black matrix 222 in the vertical direction is increased from $h_1$ to $h_2$, then, $\tan \alpha_2 = \tan \beta_2 = (h_2/2)/X$, $\theta_2 = \alpha_2 + \beta_2$, since $h_2$ is larger than $h_1$, $\alpha_2$ and $\beta_2$ are increased, then $\theta_2$ is increased, and as a result, the vertical stereoscopic visual angle of the stereoscopic display is increased.

However, the following problems exist in the prior art: after the stereoscopic display is manufactured, the structures therein are fixed, thus the vertical visual angle is fixed, that is, the vertical visual angle could not be adjusted; since the black matrix has a shading function, when the vertical visual angle is increased by increasing the line width of the black matrix in the vertical direction, the display brightness of the stereoscopic display will be reduced.

SUMMARY OF THE INVENTION

The present invention provides a stereoscopic display, which allows the vertical stereoscopic visual angle or the horizontal stereoscopic visual angle of the stereoscopic display to be adjustable, and is used for improving the display brightness of the stereoscopic display.

To fulfill the above-mentioned object, the present invention provides a stereoscopic display, including a backlight, a display panel and a phase delay film arranged at a light-exiting side of the display panel, the stereoscopic display further comprises a visual angle adjusting baffle arranged between the backlight and the display panel, and the visual angle adjusting baffle is arranged parallel to the display panel and used for adjusting a vertical stereoscopic visual angle or a horizontal stereoscopic visual angle of the stereoscopic display.

Optionally, a distance between the visual angle adjusting baffle and the display panel is adjustable, and/or a position of the visual angle adjusting baffle in a direction parallel to a pixel row direction or a pixel column direction of the display panel is adjustable.

Optionally, the stereoscopic display comprises a plurality of pixel display areas and a black matrix, the visual angle adjusting baffle comprises a plurality of transparent strips and a plurality of shading strips, the transparent strips and the shading strips are arranged alternately, light from the backlight, which passes through the transparent strips, enters the display panel, light from the backlight, which is blocked by the shading strips, does not enter the display panel, and length directions of the plurality of transparent strips and the plurality of shading strips are the same as the pixel row direction or the pixel column direction of the display panel.

Optionally, the plurality of shading strips are a plurality of reflective strips, which are used for reflecting light from the backlight arriving at the plurality of reflective strips back to the backlight.

Optionally, an included angle between first emitting light and second emitting light of any one of the pixel display areas of the display panel is: $\theta=\alpha+\beta$, $\tan \alpha=(H+a/2)/(d+D)$, wherein $\alpha$ refers to an included angle between the first emitting light and a surface normal of the display panel, $\beta$ refers to an included angle between the second emitting light and the surface normal of the display panel, H refers to a distance between a center line of the shading strip corresponding to the pixel display area and the closest stripe edge line of the phase delay film corresponding to the pixel display area, a refers to a width of the shading strip, d refers to a distance between the visual angle adjusting baffle and the display panel, D refers to a thickness of the display panel, and a line width of the black matrix is h.

Optionally, $0 \leq H \leq a/2+h/2$.

Optionally, $H=a/2+h/2$.

Optionally, $0<d<D/2$.

Optionally, when H=0, a center line of the pixel display area, a center line of the transparent strip corresponding to the pixel display area and a center line of a stripe of the phase delay film corresponding to the pixel display area are overlapped, $\alpha=\beta$, $\tan \alpha=a/2(d+D)$, and the width a of the shading strip is larger than the line width h of the black matrix.

Optionally, when $H=a/2+h/2$, a center line of the pixel display area and a center line of a stripe of the phase delay film corresponding to the pixel display area are not overlapped with a center line of the transparent strip corresponding to the pixel display area, the shading strip is located beneath the line of the black matrix of the display panel, and an upper edge of the shading strip is located on the same plane as a lower edge of the line of the black matrix, $\tan \alpha=(H+a/2)/(d+D)=(a+h/2)/(d+D)$.

Optionally, L=a+b, wherein L refers to a pixel width of the display panel, b refers to a width of the transparent strip, and the pixel width of the display panel is equal to a sum of a width of one pixel display area and the line width of the black matrix.

In the technical solution of the stereoscopic display provided by the present invention, the phase delay film is arranged at the light-exiting side of the display panel, the visual angle adjusting baffle parallel to the display panel is arranged between the backlight and the display panel, the visual angle adjusting baffle allows the vertical stereoscopic visual angle or the horizontal stereoscopic visual angle of the stereoscopic display to be adjustable, and the visual angle adjusting baffle is used for increasing the vertical stereoscopic visual angle or the horizontal stereoscopic visual angle of the stereoscopic display without increasing the line width of the black matrix, and further improving the display brightness of the stereoscopic display.

DETAILED DESCRIPTION OF THE EMBODIMENTS

In order that those skilled in the art can better understand the technical solutions of the present invention, a further detailed description of a stereoscopic display provided by the present invention will be given below in combination with the accompanying drawings.

Figure 5:
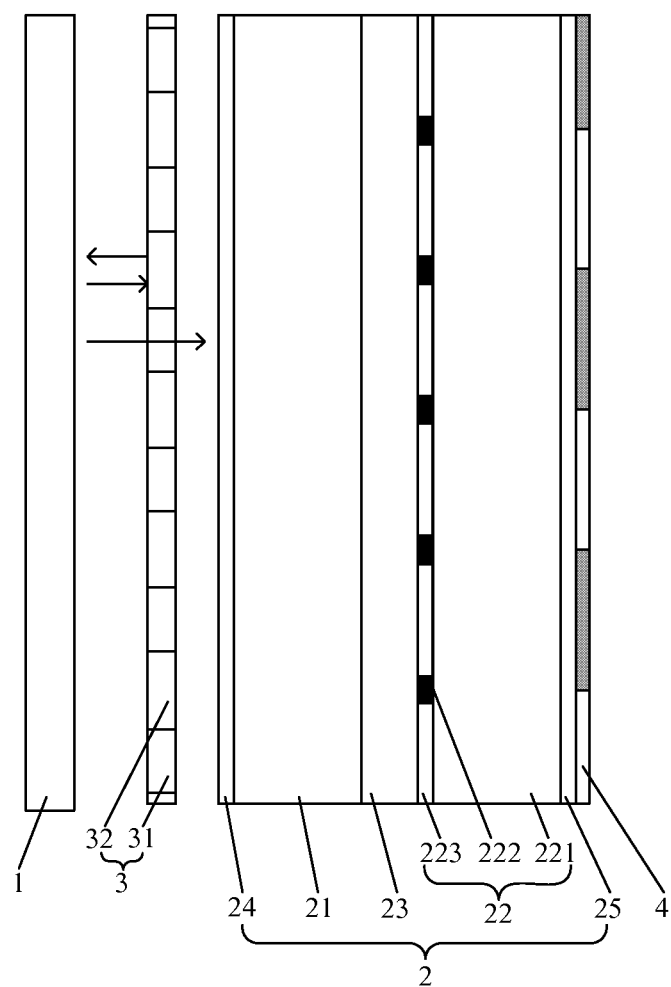
FIG. 5 is a schematic diagram of a structure of a stereoscopic display provided by an embodiment of the present invention.

FIG. 5 is a schematic diagram of a structure of a stereoscopic display provided by an embodiment of the present invention, as shown in FIG. 5, the stereoscopic display comprises a backlight 1, a display panel 2, a phase delay film 4 arranged at the light-exiting side of the display panel 2, and a visual angle adjusting baffle 3 arranged between the backlight 1 and the display panel 2, and the visual angle adjusting baffle 3 is arranged parallel to the display panel 2 and used for adjusting a vertical stereoscopic visual angle or a horizontal stereoscopic visual angle of the stereoscopic display.

The display panel 2 comprises an array substrate 21 and a color filter substrate 22, which are arranged oppositely, and a liquid crystal layer 23 arranged between the array substrate 21 and the color filter substrate 22. The color filter substrate 22 comprises a substrate 221, and a black matrix 222 and a plurality of pixel display areas 223, which are formed at the light-entering side of the substrate 221. A lower polarizer 24 is formed at the light-entering side of the array substrate 21, and an upper polarizer 25 is formed at the light-exiting side of the substrate 221 in the color filter substrate 22. The backlight 1 is used for providing light to the display panel 2.

The distance between the visual angle adjusting baffle 3 and the display panel 2 is adjustable, and/or the position of the visual angle adjusting baffle 3 in a direction parallel to a pixel row direction or a pixel column direction of the display panel 2 is adjustable.

The visual angle adjusting baffle 3 comprises a plurality of transparent strips 31 and a plurality of shading strips 32, and the transparent strips 31 and the shading strips 32 are arranged alternately. The light (as shown by the arrows in FIG. 5) from the backlight 1, which passes through the transparent strips 31, enters the display panel 2, and the light (as shown by the arrow in FIG. 5) from the backlight 1, which is blocked by the shading strips 32, does not enter the display panel 2. Length directions of the transparent strips 31 and the shading strips 32 are the same as the pixel row direction or the pixel column direction of the display panel 2. In the present embodiment, preferably, the shading strips 32 are reflective strips, as shown by the arrows in FIG. 5, the reflective strips can reflect the light from the backlight 1 arriving at the reflective strips back to the backlight 1, and the light reflected back to the backlight 1 may further enter the display panel 2 after passing through the transparent strips 31, thus improving the utilization rate of the light source.

In the stereoscopic display as shown in FIG. 5, the length directions of the transparent strips 31 and the shading strips 32 are the same as the pixel row direction of the display panel 2, and correspondingly, the length direction of the stripe of the phase delay film 4 is also the same as the pixel row direction of the display panel 2. The vertical stereoscopic visual angle of the stereoscopic display shown in FIG. 5 is adjustable, specifically, the distance between the visual angle adjusting baffle 3 and the display panel 2 can be adjusted, or the position of the visual angle adjusting baffle 3 in the direction parallel to the pixel column direction of the display panel 2 can be adjusted, or both the distance between the visual angle adjusting baffle 3 and the display panel 2 and the position of the visual angle adjusting baffle 3 in the direction parallel to the pixel column direction of the display panel 2 can be adjusted, so as to adjust the vertical stereoscopic visual angle.

Optionally, in the stereoscopic display, the length directions of the transparent strips and the shading strips are the same as the pixel column direction of the display panel, and correspondingly, the length direction of the stripe of the phase delay film is also the same as the pixel column direction of the display panel. At this time, the horizontal stereoscopic visual angle of the stereoscopic display is adjustable, specifically, the distance between the visual angle adjusting baffle and the display panel can be adjusted, or the position of the visual angle adjusting baffle in the direction parallel to the pixel row direction of the display panel can be adjusted, or both the distance between the visual angle adjusting baffle and the display panel and the position of the visual angle adjusting baffle in the direction parallel to the pixel row direction of the display panel can be adjusted, so as to adjust the horizontal stereoscopic visual angle. This case is not specifically illustrated.

Figure 6:
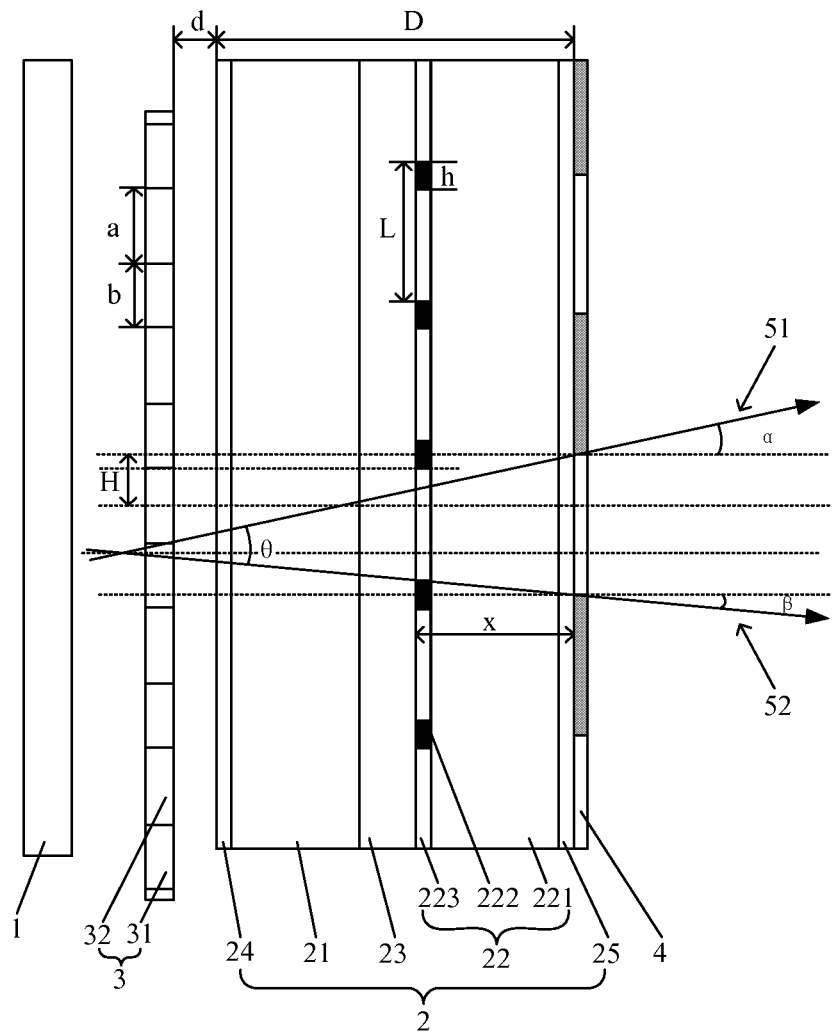
FIG. 6 is a schematic diagram of a first application of the stereoscopic display in FIG. 5.

FIG. 6 is a schematic diagram of a first application of the stereoscopic display in FIG. 5, as shown in FIG. 6, the included angle between first emitting light 51 and second emitting light 52 of any one pixel display area 223 of the display panel 2 is: $\theta=\alpha+\beta$, $\tan \alpha=(H+a/2)/(d+D)$, $\tan \beta=(h/2)/X$, wherein $\alpha$ refers to the included angle between the first emitting light 51 and the surface normal of the display panel 2, $\beta$ refers to the included angle between the second emitting light 52 and the surface normal of the display panel 2, H refers to the distance between the center line of the shading strip 32 corresponding to a pixel display area 223 and the closest stripe edge line of the phase delay film 4 corresponding to the pixel display area 223, a refers to the width of the shading strip 32 in the vertical direction, d refers to the distance between the visual angle adjusting baffle 3 and the display panel 2, D refers to the thickness of the display panel 2, and X refers to the distance between the light-entering surface of the black matrix 222 and the light-entering surface of the phase delay film 4. It can be seen from the formula regarding $\tan \alpha$ that, the larger H is, and the smaller d is, the larger the value of a is, and then the larger the $\theta$ is. Since the vertical visual angle is in direct proportion to $\theta$, the larger the $\theta$ is, the larger the vertical visual angle is. To sum up, the vertical visual angle can be adjusted by adjusting the H and/or d.

It can be seen from the formula regarding $\tan \beta$ that, $\beta$ is equal to $\beta_1$ in the prior art, that is, $\beta$ keeps unchanged. It can be seen from the light path shown in FIG. 6 that, a is larger than $\beta$, and then $\alpha$ in FIG. 6 is larger than $\alpha_1$ in the prior art.

As the first application, $0 \leq H \leq a/2+h/2$, and preferably, $H=a/2+h/2$.

As shown in FIG. 6, when $H=a/2+h/2$, the center line of a pixel display area 223 and the center line of the stripe of the phase delay film 4 corresponding to the pixel display area 223 are not overlapped with the center line of the transparent strip 31 corresponding to the pixel display area 223, the shading strip 32 is located beneath the line of the black matrix 222 of the display panel 2, and the upper edge of the shading strip 32 is located on the same plane as the lower edge of the line of the black matrix 222. At this time, $\tan \alpha=(H+a/2)/(d+D)=(a/2+h/2+a/2)/(d+D)=(a+h/2)/(d+D)$.

Figure 1:
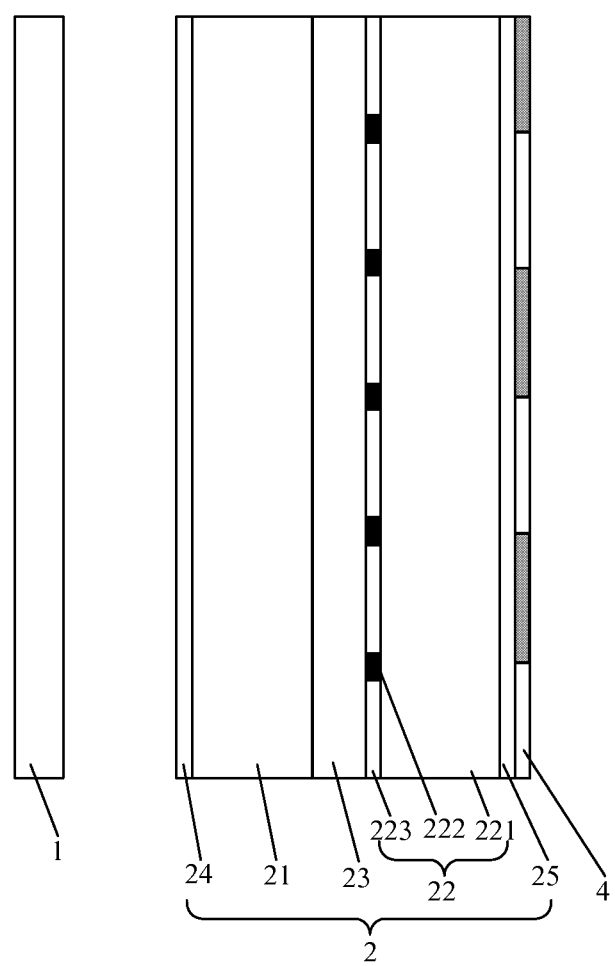
FIG. 1 is a schematic diagram of a structure of a stereoscopic display in the prior art.
Figure 2:
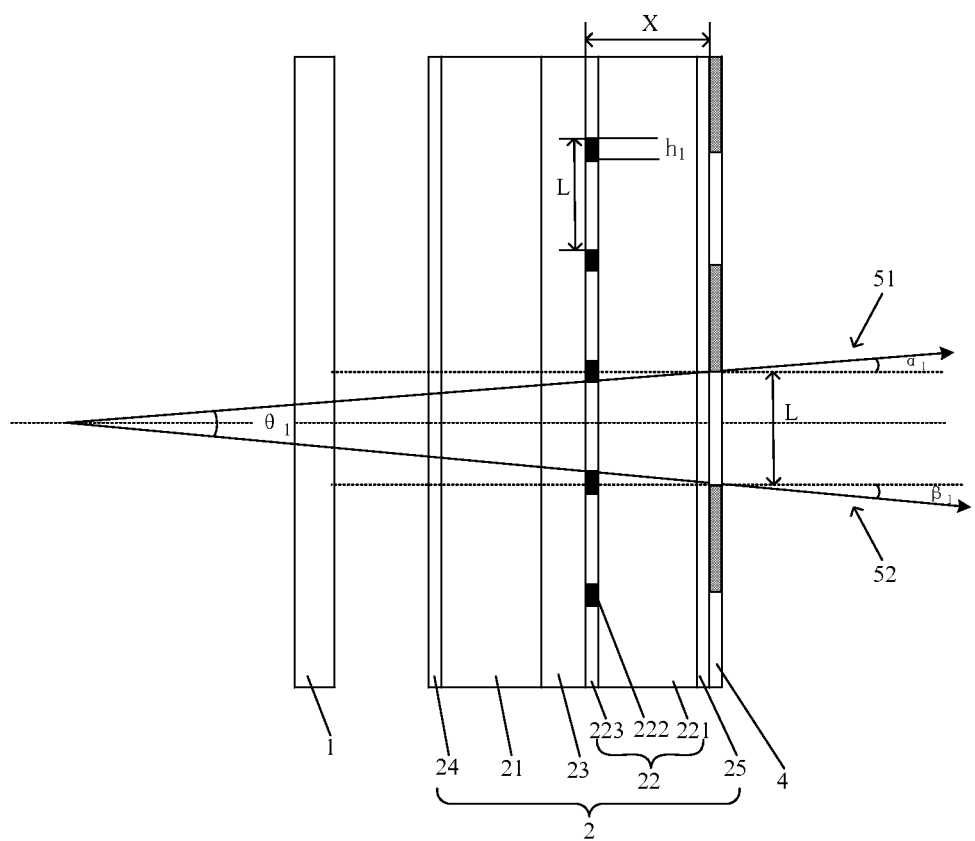
FIG. 2 is a schematic diagram of a light path during display of the stereoscopic display in FIG. 1.
Figure 3:
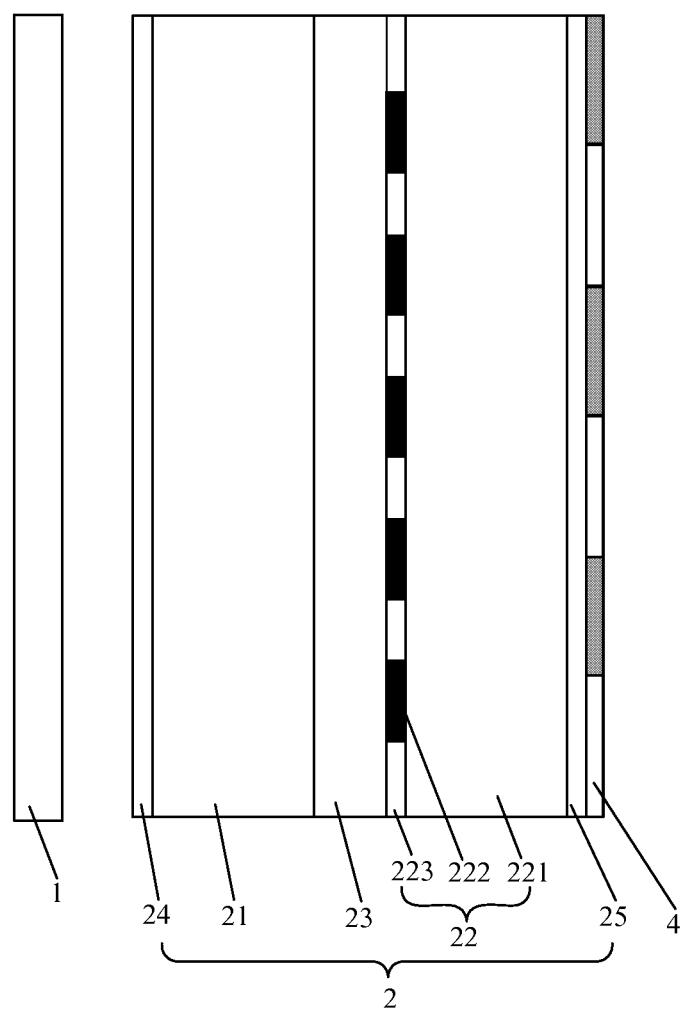
FIG. 3 is a schematic diagram of a structure of a stereoscopic display with increased line width of a black matrix in the vertical direction in the prior art.
Figure 4:
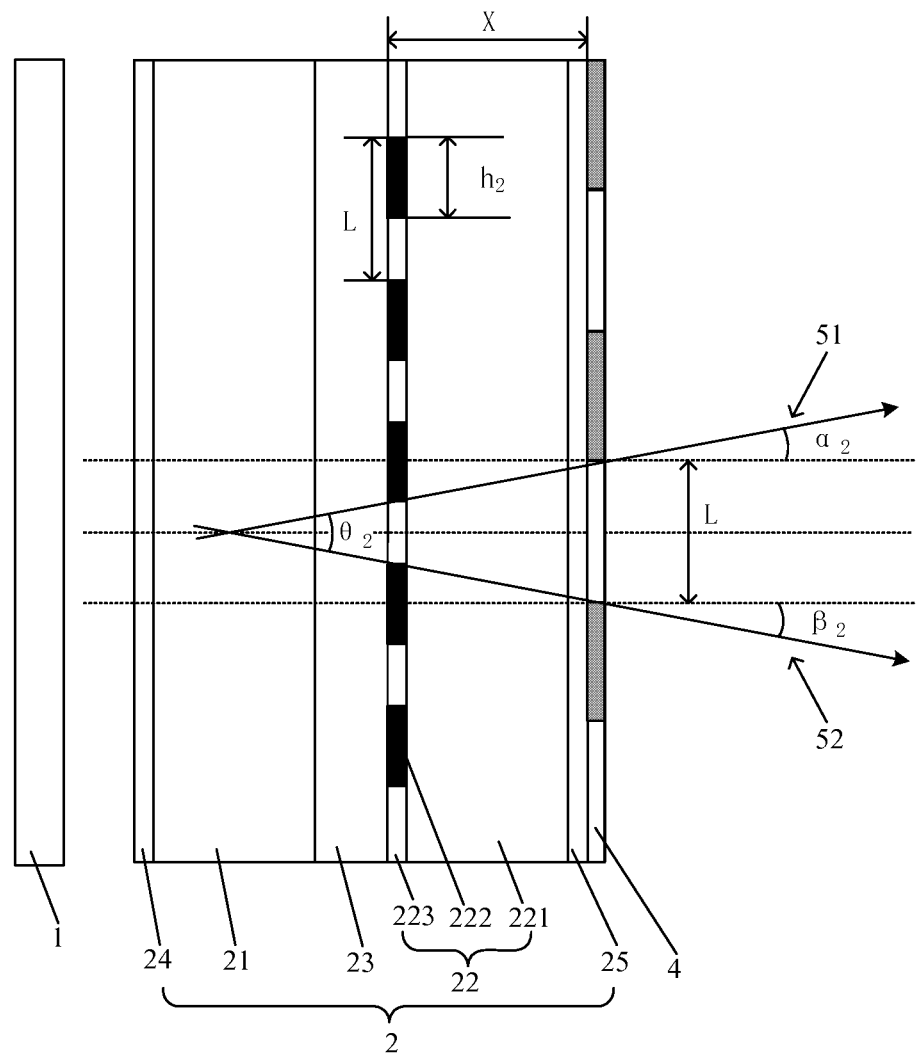
FIG. 4 is a schematic diagram of a light path during display of the stereoscopic display in FIG. 3.

As the first application, preferably, $h<a<L$, $L=a+b$, $0<d<D/2$, wherein L refers to the pixel width of the display panel 2, b refers to the width of the transparent strip 31 in the vertical direction, then $\tan \alpha=(a+h/2)/(d+D)>(h+h/2)/(1.5*D)=h/D\approx h/2X\approx \tan \alpha_1$, thus $\tan \alpha$ is larger than $\tan \alpha_1$, $\alpha$ is larger than $\alpha_1$, and then $\theta=\alpha+\beta$ is larger than $\alpha_1+\beta_1=\theta_1$. It can be obtained from the above formula that, $\theta$ is larger than $\theta_1$, and since the vertical stereoscopic visual angle is in direct proportion to $\theta$ and $\theta$ is larger than $\theta_1$, compared with the corresponding solutions shown in FIG. 1 and FIG. 2 in the prior art, the vertical stereoscopic visual angle is increased without increasing the line width of the black matrix.

In the first application, the position of the visual angle adjusting baffle 3 in the direction parallel to the pixel column direction of the display panel 2 is adjusted (i.e., H is adjusted), and/or the distance between the visual angle adjusting baffle 3 and the display panel 2 is adjusted (i.e., d is adjusted) so as to adjust the vertical stereoscopic visual angle. Compared with the visual angle adjusting baffle 3 in FIG. 5, the visual angle adjusting baffle 3 in FIG. 6 is moved downwards by H in the vertical direction. In practical application, the visual angle adjusting baffle 3 can also be moved upwards in the vertical direction, and this case will not be described herein in detail.

Figure 7:
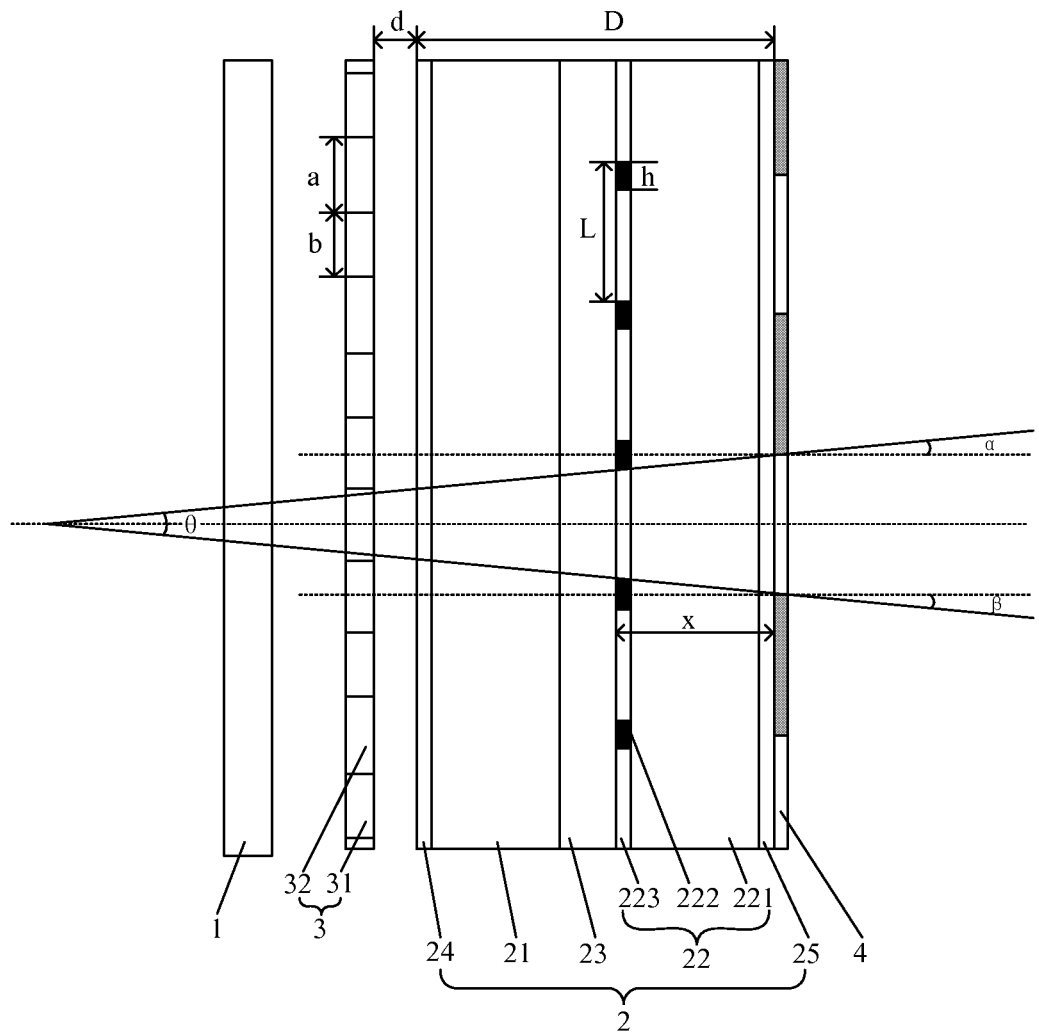
FIG. 7 is a schematic diagram of a second application of the stereoscopic display in FIG. 5.

FIG. 7 is a schematic diagram of a second application of the stereoscopic display in FIG. 5, as shown in FIG. 7, as the second application, when H=0, the center line of a pixel display area 223, the center line of the transparent strip 31 corresponding to the pixel display area 223 and the center line of the stripe of the phase delay film 4 corresponding to the pixel display area 223 are overlapped, $\alpha=\beta$. Under the condition that the shading strip 32 does not influence the first emitting light 51 and the second emitting light 52 of the pixel display area 223, at this time, $\tan \alpha=\tan \beta=(h/2)/X$. It can be obtained from the above-mentioned formula that: $\alpha=\alpha_1$, and $\beta=\beta_1$, and thus $\theta=\theta_1$. Since the vertical visual angle is in direct proportion to $\theta$ and $\theta$ is equal to $\theta_1$, compared with the corresponding solutions shown in FIG. 1 and FIG. 2 in the prior art, the vertical stereoscopic visual angle remains unchanged without increasing the line width of the black matrix. Compared with the first application shown in FIG. 6, in this application, the values of $\alpha$ and $\beta$ are changed by adjusting the value of H so as to change the value of $\theta$, and further to adjust the vertical stereoscopic visual angle.

In the second application, the position of the visual angle adjusting baffle 3 in the direction parallel to the pixel column direction of the display panel 2 is adjusted (i.e., H is adjusted) so as to adjust the vertical visual angle.

Figure 8:
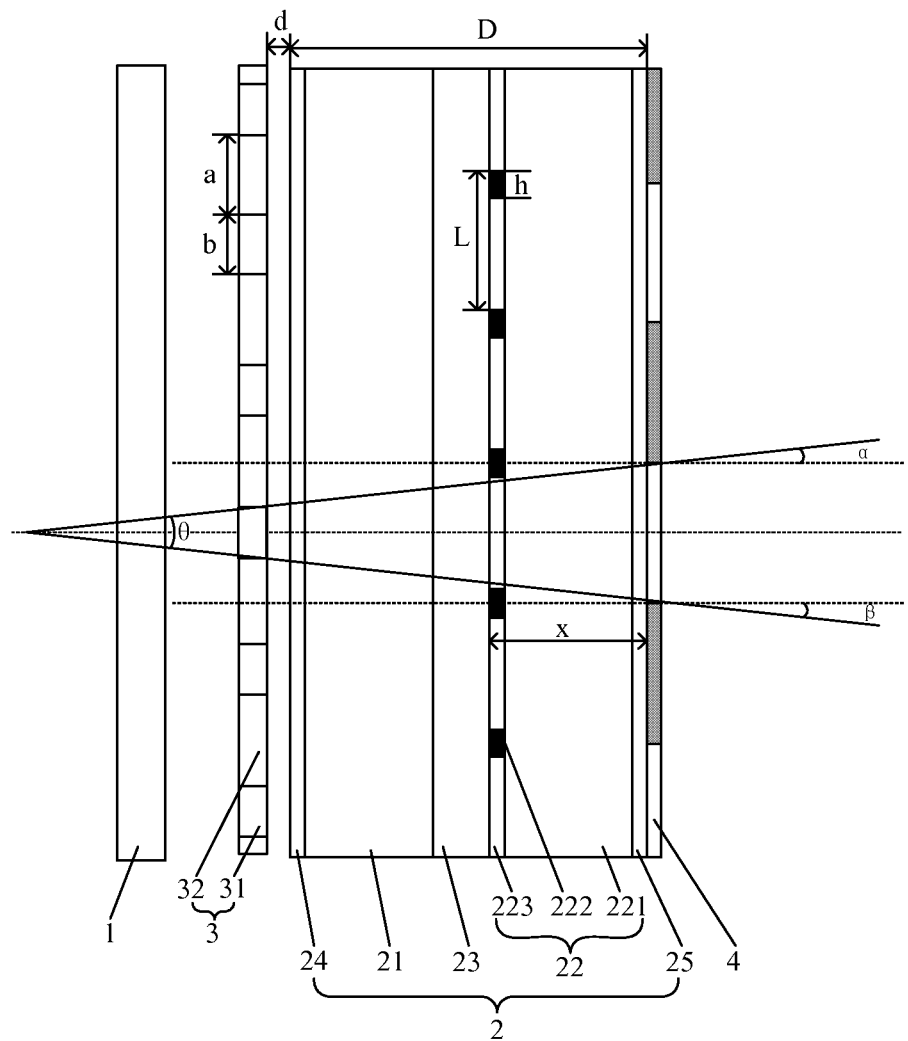
FIG. 8 is a schematic diagram of a third application of the stereoscopic display in FIG. 5.

FIG. 8 is a schematic diagram of a third application of the stereoscopic display in FIG. 5, as shown in FIG. 8, as the third application, when H=0, the center line of a pixel display area 223, the center line of the transparent strip 31 corresponding to the pixel display area 223 and the center line of the stripe of the phase delay film 4 corresponding to the pixel display area 223 are overlapped, $\alpha=\beta$, $\tan \alpha=\tan \beta=(a/2)/(d+D)$, and a is larger than h. It is assumed that in the second application shown in FIG. 7, $d=d_1$, and in the third application shown in FIG. 8, $d=d_2$, then, $d_1$ is larger than $d_2$. Therefore, when H=0, or when the value of H is fixed, the value of θ can be changed by adjusting d to change the values of α and β, and further the vertical stereoscopic visual angle can be adjusted.

In the third application, the distance between the visual angle adjusting baffle 3 and the display panel 2 is adjusted (i.e., d is adjusted) so as to adjust the vertical visual angle.

In the present embodiment, the distance between the visual angle adjusting baffle 3 and the display panel 2 and the position of the visual angle adjusting baffle 3 in the direction parallel to the pixel column direction of the display panel 2 can be adjusted by a fine tuning device.

In practical application, the length directions of the transparent strips and the shading strips in the stereoscopic display can be the same as the pixel column direction of the display panel, and correspondingly, the length direction of the stripe of the phase delay film is also the same as the pixel column direction of the display panel. At this time, the horizontal stereoscopic visual angle of the stereoscopic display is adjustable, specifically, the distance between the visual angle adjusting baffle and the display panel can be adjusted, or the position of the visual angle adjusting baffle in the direction parallel to the pixel row direction of the display panel can be adjusted, or both the distance between the visual angle adjusting baffle and the display panel and the position of the visual angle adjusting baffle in the direction parallel to the pixel row direction of the display panel can be adjusted so as to adjust the horizontal stereoscopic visual angle. This case is not specifically illustrated, the principle of adjusting the horizontal stereoscopic visual angle is the same as that of adjusting the vertical stereoscopic visual angle, and will not be repeated redundantly herein.

In the technical solution of the stereoscopic display provided by the present embodiment, the phase delay film is arranged at the light-exiting side of the display panel, the visual angle adjusting baffle parallel to the display panel is arranged between the backlight and the display panel, and the visual angle adjusting baffle is configured to allow the vertical stereoscopic visual angle or the horizontal stereoscopic visual angle of the stereoscopic display to be adjustable. The shading strips of the visual angle adjusting baffle can be reflective strips, which can reflect the light from the backlight arriving at the reflective strips back to the backlight, and the light reflected by the reflective strips to the backlight can enter the display panel after passing through the transparent strips in the visual angle adjusting baffle, so that the display brightness of the stereoscopic display is improved.

It can be understood that, the foregoing implementations are merely exemplary implementations used for explaining the principle of the present invention, but the present invention is not limited thereto. Those of ordinary skill in the art may make various variations and improvements without departing from the spirit and essence of the present invention, and these variations and improvements also fall within the protection scope of the present invention.

The invention claimed is:

1. A stereoscopic display, comprising a backlight, a display panel and a phase delay film arranged at a light-exiting side of the display panel, wherein the stereoscopic display further comprises a visual angle adjusting baffle arranged between the backlight and the display panel, and the visual angle adjusting baffle is arranged parallel to the display panel and used for adjusting a vertical stereoscopic visual angle or a horizontal stereoscopic visual angle of the stereoscopic display; and wherein a distance between the visual angle adjusting baffle and the display panel is adjustable, and/or a position of the visual angle adjusting baffle in a direction parallel to a pixel row direction or a pixel column direction of the display panel is adjustable;

the display panel comprises a plurality of pixel display areas and a black matrix, the visual angle adjusting baffle comprises a plurality of transparent strips and a plurality of shading strips, the transparent strips and the shading strips are arranged alternately, light from the backlight, which passes through the transparent strips, enters the display panel, light from the backlight, which is blocked by the shading strips, does not enter the display panel, and length directions of the plurality of transparent strips and the plurality of shading strips are the same as the pixel row direction or the pixel column direction of the display panel;

an included angle between first emitting light and second emitting light of any one of the pixel display areas of the display panel is: $\theta = \alpha + \beta$, $\tan \alpha = (H+a/2)/(d+D)$, α refers to an included angle between the first emitting light and a surface normal of the display panel, β refers to an included angle between the second emitting light and the surface normal of the display panel, H refers to a distance between a center line of the shading strip corresponding to the pixel display area and the closest stripe edge line of the phase delay film corresponding to the pixel display area, a refers to a width of the shading strip, d refers to a distance between the visual angle adjusting baffle and the display panel, D refers to a thickness of the display panel, and a line width of the black matrix is h;

the width a of the shading strip is larger than the line width h of the black matrix; and $L = a+b$, L refers to a pixel width of the display panel, b refers to a width of the transparent strip, and the pixel width of the display panel is equal to a sum of a width of one pixel display area and the line width of the black matrix.

2. The stereoscopic display of claim 1, wherein the plurality of shading strips are a plurality of reflective strips, which are used for reflecting light from the backlight arriving at the plurality of reflective strips back to the backlight.

3. The stereoscopic display of claim 1, wherein $0 \leq H \leq a/2 + h/2$.

4. The stereoscopic display of claim 3, wherein $H = a/2 + h/2$.

5. The stereoscopic display of claim 1, wherein $0 < d < D/2$.

6. The stereoscopic display of claim 1, wherein when $H=0$, a center line of the pixel display area, a center line of the transparent strip corresponding to the pixel display area and a center line of a stripe of the phase delay film corresponding to the pixel display area are overlapped, $\alpha = \beta$, $\tan \alpha = a/2(d+D)$.

7. The stereoscopic display of claim 1, wherein when $H = a/2 + h/2$, a center line of the pixel display area and a center line of a stripe of the phase delay film corresponding to the pixel display area are not overlapped with a center line of the transparent strip corresponding to the pixel display area, the shading strip is located beneath the line of the black matrix of the display panel, and an upper edge of the shading strip is located on the same plane as a lower edge of the line of the black matrix, $\tan \alpha = (H+a/2)/(d+D) = (a+h/2)/(d+D)$.

* * * * *